United States Patent
Fuchs et al.

(10) Patent No.: US 8,848,052 B2
(45) Date of Patent: Sep. 30, 2014

(54) PROCESSING METHOD USING AN ELECTRIC TOOL

(75) Inventors: Andreas Fuchs, Bern (CH); Jochen Ganz, Uster (CH)

(73) Assignee: Marquardt GmbH, Rietheim-Weilheim (DE)

( * ) Notice: Subject to any disclaimer, the term of this patent is extended or adjusted under 35 U.S.C. 154(b) by 1042 days.

(21) Appl. No.: 12/888,662

(22) Filed: Sep. 23, 2010

(65) Prior Publication Data

US 2011/0063438 A1    Mar. 17, 2011

Related U.S. Application Data

(63) Continuation of application No. PCT/DE2009/000396, filed on Mar. 27, 2009.

(30) Foreign Application Priority Data

Mar. 28, 2008    (DE) .......................... 10 2008 016 021

(51) Int. Cl.
*H04N 7/18*    (2006.01)
*G06K 9/36*    (2006.01)
*B25H 1/00*    (2006.01)

(52) U.S. Cl.
CPC .................................. *B25H 1/0085* (2013.01)
USPC ......................................... 348/142; 382/291

(58) Field of Classification Search
USPC ........... 348/142; 382/291; 702/186; 606/130; 250/559.3
See application file for complete search history.

(56) References Cited

U.S. PATENT DOCUMENTS

| | | | |
|---|---|---|---|
| 6,878,954 B2 * | 4/2005 | Butler et al. ................ | 250/559.3 |
| 8,630,819 B2 * | 1/2014 | English et al. ................ | 702/186 |
| 2003/0031383 A1 * | 2/2003 | Gooch .......................... | 382/291 |
| 2005/0203544 A1 * | 9/2005 | Revie et al. ................... | 606/130 |
| 2005/0232465 A1 | 10/2005 | Braune et al. | |

FOREIGN PATENT DOCUMENTS

| | | |
|---|---|---|
| DE | 101 16 015 A1 | 10/2002 |
| DE | 102 37 724 A1 | 3/2004 |
| DE | 20 2004 018 003 U1 | 2/2005 |
| DE | 10 2006 006 475 A1 | 8/2007 |
| EP | 1 586 805 A1 | 10/2005 |
| GB | 2 385 293 A1 | 8/2003 |
| WO | 02/068982 A2 | 9/2002 |

* cited by examiner

*Primary Examiner* — Gims Philippe
(74) *Attorney, Agent, or Firm* — Burr & Brown, PLLC

(57) ABSTRACT

The invention relates to a method and an apparatus for processing a workpiece, such as a wall, a ceiling, a floor or the like in a building, by means of an appliance which can be moved, in particular an electric tool, wherein the appliance can be moved to at least one predeterminable nominal position. Essentially continuous position identification, in particular by means of optical methods, is carried out for the respective actual position of the appliance and/or of an object which can be moved corresponding to the appliance. The position information, such as the coordinates of the respective determined actual position and/or information relating to any, discrepancy between the nominal position and the actual position, is transmitted wirelessly to the appliance. The respective position information is indicated to the user on the appliance, for manual position control.

16 Claims, 5 Drawing Sheets

PROCESSING METHOD USING AN ELECTRIC TOOL

CROSS REFERENCE TO RELATED APPLICATIONS

This application is a continuation of International Application No. PCT/DE2009/000396 filed Mar. 27, 2009, which designated the United States, and claims the benefit under 35 USC §119(a)-(d) of German Application No. 10 2008 016 021.0 filed Mar. 28, 2008, the entireties of which are incorporated herein by reference.

FIELD OF THE INVENTION

The invention relates to a method for processing a workpiece, and to a corresponding apparatus.

BACKGROUND OF THE INVENTION

Hand held electric tools, also referred to as power tools, are already used extensively for the processing of workpieces in buildings. The workpiece may be a wall, a ceiling, a floor or the like in the building.

Workpieces such as these in buildings are frequently processed by means of a movable appliance, which is controlled by hand. In this case, the user moves the appliance by hand to a predetermined nominal position. It is immediately evident that the processing accuracy can suffer from this. When a plurality of successive nominal positions are intended to be achieved, for example, in order to produce a hole pattern, then this process is not only inaccurate but is also tedious. In particular, in this case, time-consuming measurements of the working area and/or of the workpiece are necessary. It would be possible to reduce the effort involved in work preparation if user-friendly navigation for the appliance were to largely eliminate the measurement of the working area.

SUMMARY OF THE INVENTION

The invention is based on the object of further developing the manually controlled method for processing of workpieces by means of a movable appliance, such that the work of the electric tool user is made easier and these tools are made more useful to the user. One particular aim is to specify a method for processing of workpieces by means of a movable appliance, which achieves high accuracy and, in particular, is as labor saving as possible, with minimal hardware complexity. A further aim is to provide an apparatus which is suitable for this purpose.

In the method according to the invention, essentially continuous position identification, in particular by means of optical methods, is carried out for the respective actual position of the appliance and/or of an object which can be moved corresponding to the appliance. The position information determined in this way, such as the coordinates of the respective determined actual position and/or information relating to any discrepancy between the nominal position and the actual position, is then indicated to the user on the appliance, for manual position control. A navigation method is therefore provided for working with electric tools on a plane and/or in space. This method advantageously allows quick and simple work on the plane and/or in space, for example when drilling holes which are positioned relative to one another.

In another embodiment of the method according to the invention, the respective position information is transmitted wirelessly to the appliance, thus allowing the appliance to be handled by the user without any restrictions.

In one development of the method according to the invention, the appliance projects a marking, for example, a reticle, onto the workpiece. The position of the marking is recorded, in particular with respect to a fixed reference, by means of at least one camera. This therefore results in a type of two-dimensional (2D) navigation for the appliance. This method can be extended to three-dimensional (3D) navigation by means of a plurality of cameras. For example, for extension to a plurality of dimensions the power tool can throw a light pattern in any spatial direction. A plurality of cameras can look out from one location in a plurality of spatial directions, that is to say the position of the power tool in space can then be indicated, rather than just the position in front of a plane.

In another development, three-dimensional (3D) navigation is achieved by the appliance having a passive and/or active marking, and by the position of the marking being recorded by means of at least two cameras. The cameras are in turn arranged on a base, for example a base line, a beam or the like.

In another embodiment, three-dimensional (3D) navigation is carried out in the form of the "lighthouse principle". A light beam which can be moved on the horizontal plane and on the vertical plane starting from an initial position is for this purpose transmitted by a light transmitting station. The incidence of the light beam on the appliance is registered by means of a light receiver which is located adjacent to or on the appliance. The distance between the light transmitting station and the appliance can then be determined, if required, by means of a distance measuring means. The position of the appliance can then be determined by means of the time difference between the transmission of the light beam in the initial position and the reception of the light beam at the light receiver and, possibly, by means of the distance determined by the distance measuring means. A laser beam is expediently used as the light beam.

In yet another embodiment, three-dimensional (3D) navigation for the appliance is provided by identification of markers. For this purpose, the appliance has at least two markers. The image of the markers is recorded by means of a camera such that the position of the appliance can be determined from the recorded image.

In another embodiment, which can be implemented easily and is cost-effective, two-dimensional (2D) navigation is carried out on the basis of the "laser mouse" principle, as known from computer technology. For this purpose, a sensor which is located on the appliance detects the changes in the structure on the workpiece during movement of the appliance. The relative movement of the appliance can be determined from the detected changes in the structure. The distance traveled by the power tool and/or the integrated speeds of the power tool, which are determined on the basis of the relative movement, in turn make it possible to determine the position information for the appliance.

In one simple and cost-effective embodiment, an apparatus for carrying out the method according to the invention comprises an optical unit which receives and/or transmits optical radiation and produces measured values to locate the appliance. In addition, the apparatus comprises a computer which uses the measured values to calculate the position information for the appliance. Finally, an indicating unit is located on the appliance, which indicates the position information to the user, for manual position control.

In one development of the apparatus, the computer for calculating the position information can be arranged in the appliance. In another development of the apparatus, the computer for calculating the position information can be arranged externally to the appliance. In this case, transmitters and/or receivers expediently transmit the position information between the computer and the appliance.

The following statements can be made for one particularly preferred embodiment of the invention. Image identification is used in order to determine the azimuth and elevation of a light marker which is projected by the electric tool on the axis of the tool onto the wall to be processed. The radial distance between the sensor, for example a camera, and the light marker as well as the angle between the viewing direction of the camera and the plane are calibrated by a "calibration cross", that is to say a light pattern with a defined geometry.

For developments of this particularly preferred embodiment, the image evaluation system transmits the coordinates wirelessly to the electric tool, where they are displayed on a display. The coordinates can be zeroed at a specific point, for example the first drilled hole in the working surface, as a result of which it is possible to work with relative coordinates. If the calibration cross has a spirit level, it is also possible to calibrate the vertical direction, that is to say parallel to gravity.

The direction in which the vertical and/or horizontal runs can therefore be indicated to the user. The electrical tool can be equipped with a measurement device for determining the distance from the working surface. Distances in the centimeter range can preferably be measured by means of ultrasound, which, in the case of drilling machines by way of example, makes it possible to determine the drilling depth. The system can be developed further such that the processed positions can be recorded for documentary purposes.

The advantages achieved by the invention are, in particular, that the work on a plane which occurs frequently is made easier by means of the appliance. In particular, grid-like tasks can be carried out easily and cost-effectively with the aid of the method according to the invention and/or the apparatus according to the invention. The proposed method requires relatively uncomplex hardware. The calibration can be carried out quickly and easily. Before work starts, all that is necessary is to place the calibration cross on the working plane in order to allow the camera and the image evaluation computer to carry out the calibration. Relative coordinates, which can be indicated on the appliance, are available to the user. In consequence, the user need not do any calculations to find the desired positions, but he can in fact transfer the dimensions from a dimensioned plan, in a simple manner.

BRIEF DESCRIPTION OF THE DRAWINGS

Exemplary embodiments of the invention together with various developments and refinements will be described in more detail in the following text and are illustrated in the drawings, in which.

DETAILED DESCRIPTION OF THE INVENTION

Figure 1:
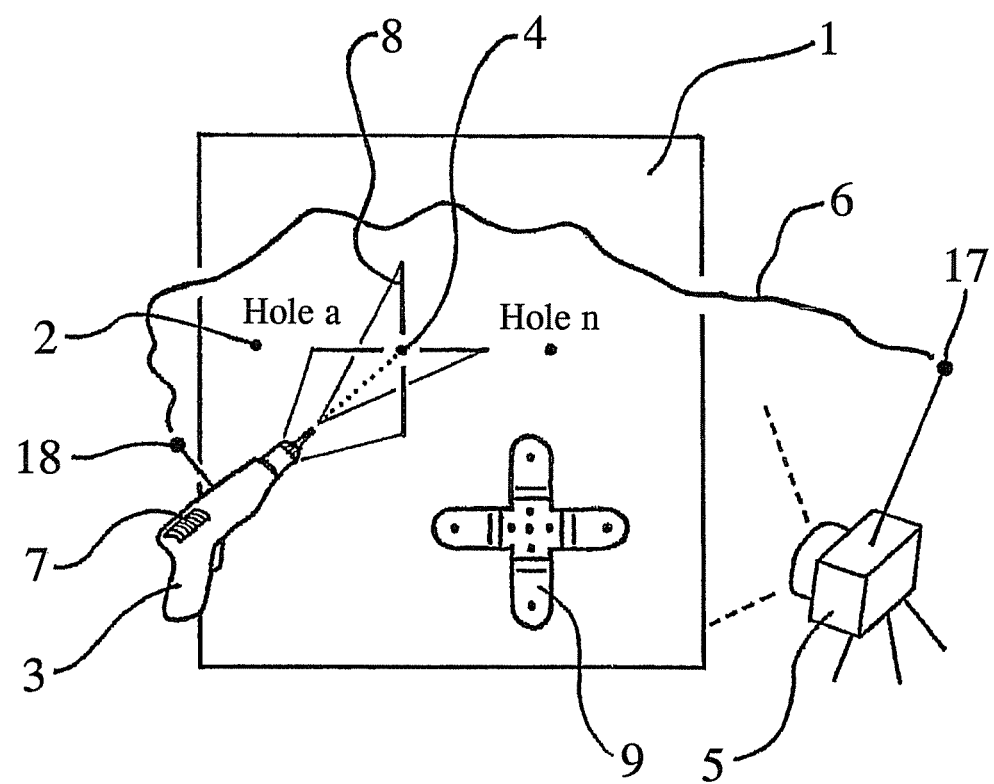
FIG. 1 shows an arrangement for navigation of an appliance according to a first exemplary embodiment ("position locator")

The method for processing a workpiece 1 will be explained in more detail with reference to FIG. 1. The workpiece 1 may be a wall, a ceiling, a floor or the like in a building, wherein, for example, the intention is to introduce a hole into the workpiece 1 at least one nominal position 2 by means of a movable appliance 3 which is controlled by hand. The appliance 3 is an electric tool, for example a drilling machine, an impact drilling machine or a hammer drill. In order to allow the appliance 3 to be moved to the predeterminable nominal position, essentially continuous position identification is carried out for the respective actual position of the appliance 3. An object 4 which can be moved corresponding to the appliance 3 is detected for this purpose, in which case the object 4 is a light spot projected by the appliance 3 onto the workpiece 1. Detection is carried out by optical methods, to be precise in this case by recording by means of a camera 5, and the detection process is therefore carried out separately from the appliance 3 by the camera 5. The position information, such as the coordinates of the respective determined actual position and/or information relating to any discrepancy between the nominal position and the actual position, is determined by a computer, which is located in the camera 5, on the basis of the image of the object 4 recorded by the camera 5, and is then transmitted by means of electromagnetic signals 6 from the camera 5 wirelessly to the appliance 3. The respective position information is then indicated to the user by means of a display 7 on the appliance 3, for manual position control. By way of example, the indication may be provided in a simple manner by means of absolute coordinates, difference coordinates, direction arrows or the like. Direction arrows make it possible to signal to the user in a simple manner the direction in which the appliance 3 should be moved in order to reach the nominal position 2. Furthermore, the length of the direction arrows can symbolize the current distance between the actual position and the nominal position.

FIG. 1 likewise shows, as a development, two-dimensional (2D) navigation in the form of a "position locator" for the appliance 3. The appliance 3 projects a marking, to be precise a reticle 8 or a light cross, instead of the light point 4, onto the workpiece 1. The position of the marking 8 is recorded by means of at least one camera 5 with respect to a fixed reference 9, which is a reference cross attached to the workpiece 1 in advance and appropriately measured. As already mentioned, this method can be extended to three-dimensional (3D) navigation by means of further cameras, which are not shown here.

The position locator method is particularly suitable for introduction of a plurality of drilled holes, which are located on the plane, such as a wall, a floor, a ceiling, and are intended to have a specific relative distance between them, as will be explained in more detail in the following text. In this case, by way of example, the relative coordinates are defined relative to the first hole. In addition to this frequent use for "drilling and/or processing hole patterns", the position locator method is also suitable for following curves with the appliance 3, for example when sawing or grinding.

The idea is now for the power tool 3 to project a light pattern 8 onto a plane 1. The position of this light pattern 8 can be identified by a digital camera 5, by means of image evaluation by a computer on the processed plane 1, in the image. The digital camera 5 observes the planar working surface 1.

An image processing program runs on an industrial computer and evaluates the camera image. The distance, length and/or distortion calibration of the image as seen by the camera 5 is carried out with the assistance of a cross 9 with a spirit level. The cross 9 is equipped with light sources and/or optical markers, whose relative position is known to the industrial computer. Lasers project a reticle 8 forward onto the wall 1 from the drilling machine 3. The intersection of the reticle 8 lies on the drill axis. The drilling machine 3 receives the information wirelessly from the camera 5 and the industrial computer as to where the reticle 8 is located in the image. The coordinates are signaled to the user on a display 7, for example on the front handle of the drilling machine 3. The drilling machine user places the drilling machine 3 on the wall 1 for the hole a in a series of holes, and zeros the coordinates by pushing a button on the drilling machine 3. When the drilling machine 3 is moved, then the coordinates indicated on the display 7 on the drilling machine 3 change, to be precise the relative coordinates with the zero point of the first drilled hole. The drilling machine 3 is equipped with means for measuring the distance from the wall 1 by ultrasound, in order to measure the depth of the drilled hole. The effect of this is that it is possible to produce hole 2 to hole n very quickly relative to hole a, without having to use a measuring tape. In addition, the drilled-hole depth can also be read on the display 7. The spirit level also defines the vertical, in which case the arms of the cross 9 must be sufficiently long, that is to say vertical and horizontal rows of holes can be drilled quickly.

This method for efficient drilling of hole patterns is illustrated in FIG. 1. The camera 5 wirelessly transmits the identified position of the power tool 3 to the power tool 3. This indicates to the user the coordinates relative to the hole a. The system is calibrated by means of a calibration cross 9.

The position locator method results in the following advantages:
 There is no need for a line of sight between the camera 5, which is used as the reference station, and the power tool 3 itself, but only between the reference station and the light pattern 8 on the wall 1 in front of the power tool 3.
 The user has to provide only one reference station, not a plurality of them.
 The user can read the position on the drilling machine 3. He does not need to program coordinates into the reference station, but he can read his plans and work as before.
 A drilled-hole depth measurement can additionally be added.

Although the 2D method assumes that the plane 1, that is to say the wall, the floor or the ceiling, is not curved, curvature can be compensated for by calibration by means of the calibration cross 9.

Figure 2:
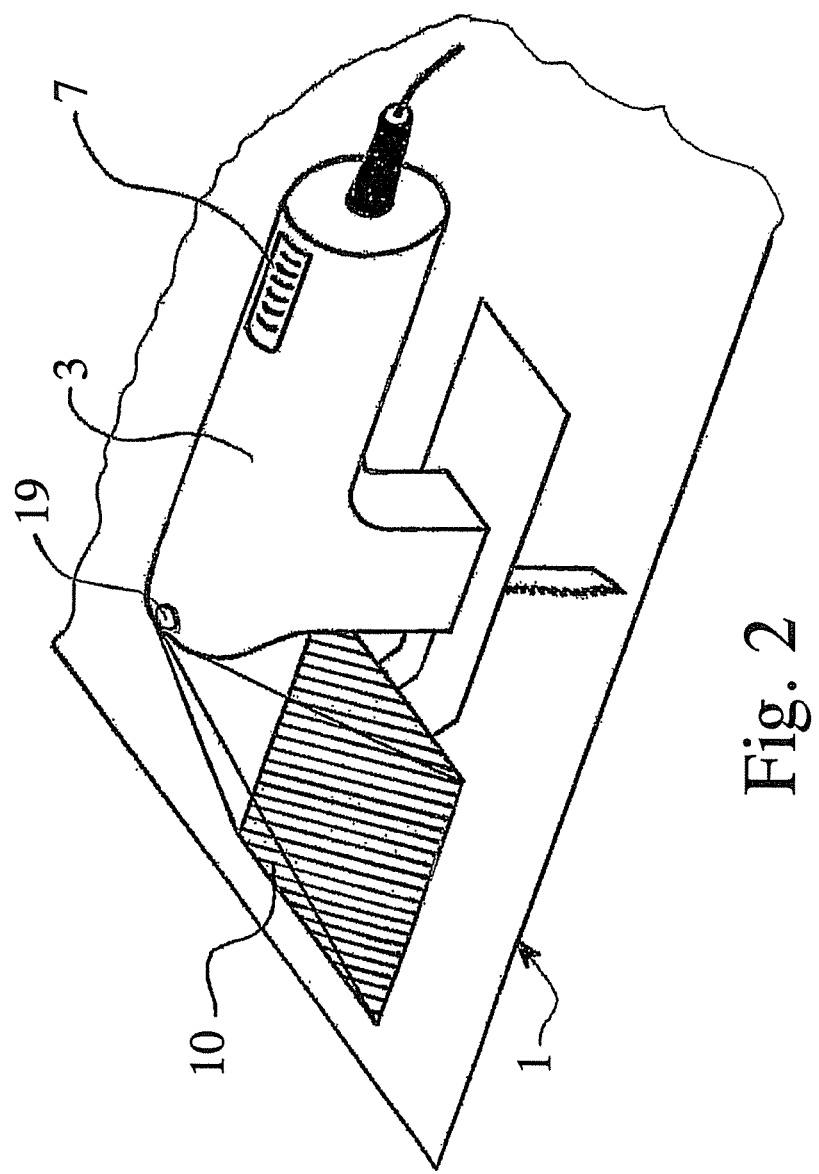
FIG. 2 shows an arrangement for navigation of an appliance according to a second exemplary embodiment ("mouse principle")

As another embodiment, FIG. 2 shows two-dimensional (2D) navigation in the form of an "optical mouse" or "laser mouse" (computer mouse), which themselves function on surfaces with a very minimal structure 10, for the appliance 3 which, for example, is in the form of a jigsaw.

The 2D navigation method for the power tool 3 based on the "mouse principle" is suitable for use on a plane 1, for example on walls, ceilings, facades or the like with a minimal structure 10. The relative coordinates can be determined relative to the first hole. Frequent applications are for drilling and/or processing hole patterns, or for following curves, for example for sawing or grinding. The idea is that the power tool 3 periodically observes the structure 10 of the wall 1 and calculates the shift in the x and/or y direction from the change in the image and/or the signal, that is to say the pattern recognition in the image allows speed or position measurement.

A sensor 19, which is connected to the power tool 3, moves at a constant distance over the plane 1 to be processed. The relative movement of the power tool 3 with respect to the wall 1 is measured from the image. The coordinates can be zeroed at any desired points, and this allows distance measurements without mental calculation. In a similar manner to that in the case of the GPS system, waypoints can be set, and trajectories can also be defined here. It is then possible, for example, to saw along these trajectories. The method of operation can be seen in more detail in FIG. 2, specifically the power tool 3 measures either distances between identifiable patterns or structures 10 and thus calculates the distance traveled on the plane 1, or it measures the speed and integrates this, in order in this way to calculate the corresponding distance. The computer for calculating the position information is in this case, in contrast to the apparatus shown in FIG. 1, not arranged externally to the appliance 3, but in fact is located in the appliance 3. In this case, there is therefore no need for wireless transmission of the position information to the appliance 3.

This method results in the following advantages:
 There is no need for an external reference station, that is to say this method does not rely on a free line of sight.
 The method is simple to use.
 There is no need for accessories external to the appliance.

Since the power tool 3 has to move along the surface, this method is better suited for working on the floor than on the ceiling and/or on a wall. If dust on the sensor window on the power tool 3 represents a problem for coverage of the sensor 19 which is located in the interior of the power tool 3, this dust can be removed in a suitable manner, for example by means of an air flow produced by the fan in the power tool 3.

Figure 3:
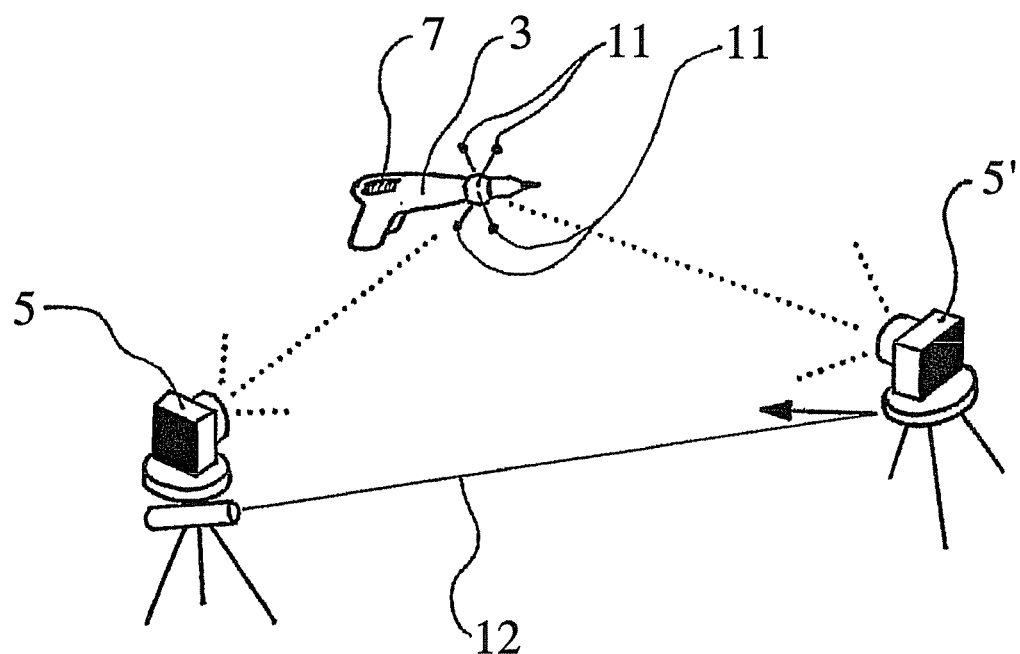
FIG. 3 shows an arrangement for navigation of an appliance according to a third exemplary embodiment ("3D navigation traditionally by triangulation")

As yet another embodiment, FIG. 3 shows three-dimensional (3D) navigation of the "traditional" type. The appliance 3 has a marking 11 which may be passive and/or active. The position of the marking 11 is recorded by means of at least two cameras 5, 5'. The two cameras 5, 5' are arranged on a base 12, which may consist of a base line, a beam or the like, thus allowing the coordinates of the position of the appliance 3 to be calculated from the image of the marking 11 in the cameras 5, 5'.

The "3D navigation traditionally by triangulation" method is suitable for three-dimensional navigation in a space. This is used for absolute navigation, that is to say relative to the base line and/or to the reference station, in a volume. The idea is for two cameras 5, 5', which are installed on a base line 12 or are mounted on a beam, to observe the power tool 3 or passive and/or active markers 11 on the power tool 3.

The cameras 5, 5' identify the markers 11 on the power tool 3. The power tool 3 is located where the lines of sight of the cameras 5, 5' to the power tool 3 are closest together. The distortion and the size of the marker image can also be evaluated in order, for example, to determine the position of the power tool 3 in space. FIG. 3 illustrates in more detail traditional triangulation in space, in which the angles are determined by means of image identification.

In this method, care must also be taken to ensure that the edge length of the working volume is less than the length of the base line 12. In other words, a long base line 12 is required for large working volumes. Although the creation of a base line 12 requires somewhat more effort than the positioning of a single base station or reference station, it is, however advantageous, that the method works very precisely.

Figure 4:
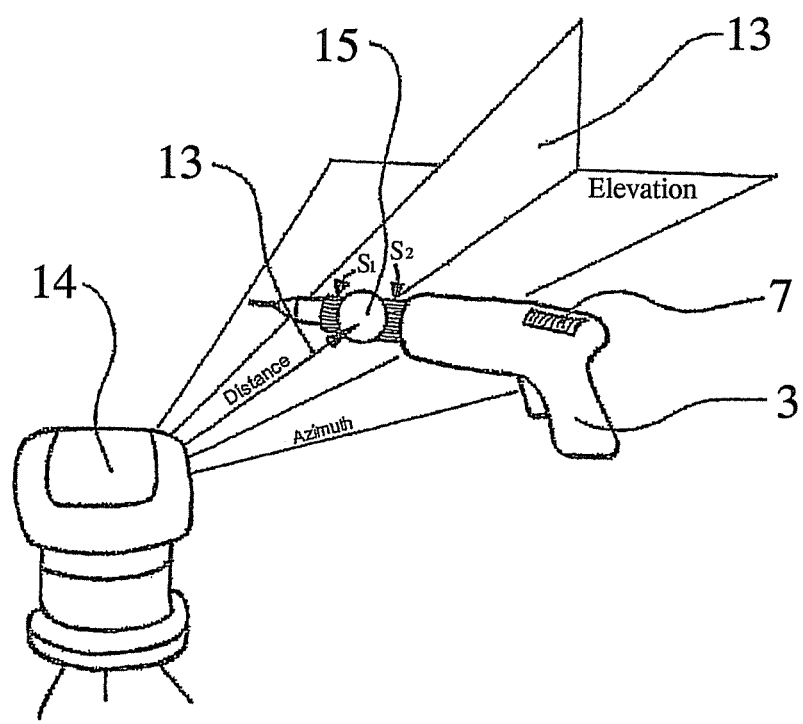
FIG. 4 shows an arrangement for navigation of an appliance according to a fourth exemplary embodiment ("3D navigation according to the lighthouse principle")

At yet another embodiment, FIG. 4 shows three-dimensional (3D) navigation based on the "lighthouse" principle".

A light beam 13 which can be moved on a horizontal plane and on a vertical plane starting from an initial position is transmitted by a light transmitting station 14. The light transmitting station 14 is expediently a laser, with the light beam 13 being formed by a laser beam. The incidence of the light beam 13 on the appliance 3 is registered by means of a light receiver 15 which is located on the appliance 3. If required, the distance between the light transmitting station 14 and the appliance 3 can also be determined by a distance measuring means. The position of the appliance 3 can therefore be determined by means of the time difference between the transmission of the light beam 13 by the light transmitting station 14 in the initial position and the reception of the light beam 13 at the light receiver 15 and, possibly, by means of the distance determined by the distance measuring means.

The "3D navigation based on the lighthouse principle" method is suitable for three-dimensional navigation in a space. It is used for absolute navigation in a volume, for example represented by spherical coordinates with the base station 14 as the center. The idea is to use the lighthouse principle for navigation for the power tool 3. An angle is measured indirectly over the time which has passed between the initial position and incidence on the light receiver 15. This is in turn used to measure the azimuth and elevation of the power tool 3 as seen from a base station 14. The radial distance between the base station 14 and the power tool 3 is obtained from an ultrasound or laser distance measurement. The coordinates are transmitted wirelessly to the power tool 3, and can also be indicated as Cartesian coordinates on the display 7.

A laser sheet 13 encircles a vertical axis of the light transmitting station 14. The power tool 3 identifies the vertical laser sheet 13 passing by. Because the angular velocity is known, the azimuth angle can be calculated from the time difference between a light pulse or radio pulse (time $t_A=0$) and the time when the laser sheet 13 passes by. A laser sheet 13 shakes or wobbles (horizontally) up and down at right angles to the vertical laser sheet of the vertical axis mentioned above. A time difference between another light pulse or another radio pulse (time $t_E=0$) and the laser sheet 13 passing by allows the elevation angle to be calculated. A distance measuring means looks in the direction which is defined by the azimuth and elevation and measures the distance to the power tool 3. When the aim is to work on a wall 1, the plane of this wall 1 can be defined by setting three points. The software should in turn allow lines to be defined on this plane 1.

As illustrated in FIG. 4, sensors 15 on the power tool 3 identify when the laser sheets 13 pass by. This makes it possible to determine azimuth and elevation angles. A tracking system follows the reflector ball 15 and measures the radial distance between the base station 14 and the reflector ball 15 by means of a laser.

It should be noted in this method that the time resolution becomes better the more often the laser sheets 13 can be seen by the power tool 3. Highly reflective surfaces are possibly also necessary on the power tool 3. The second, horizontal laser sheet 13, which wobbles up and down, can possibly be replaced by an optical tracker.

This method results in the following advantages:
No baseline is required, only a base station 14.
Only one additional appliance is required, specifically the base station 14.

Figure 5:
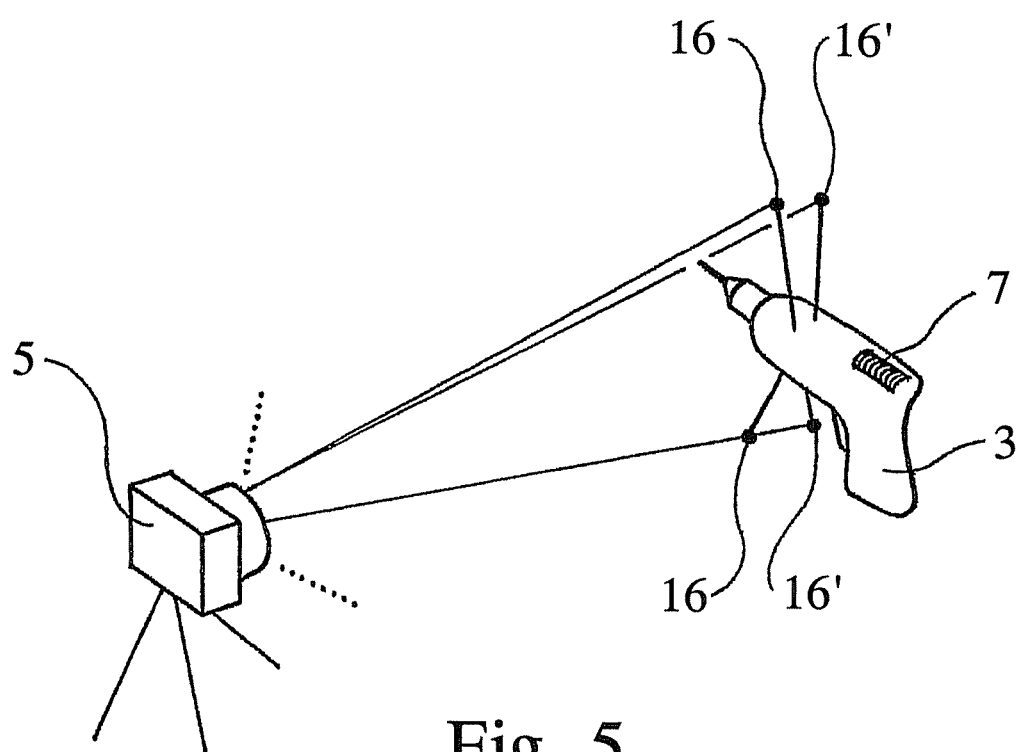
FIG. 5 shows an arrangement for navigation of an appliance according to a fifth exemplary embodiment ("3D navigation by identification of markers").

Finally, as yet another embodiment, FIG. 5 shows three-dimensional (3D) navigation by "identification of markers". For this purpose, the appliance 3 has at least two markers 16, 16'. The image of the markers 16, 16' is recorded by means of a camera 5. The position of the appliance 3 can be determined from the recorded image of the markers 16, 16'.

The "3D navigation by image identification of marker images" method is suitable for three-dimensional navigation in a space. This is used for absolute navigation, that is to say relative to the reference station, in a volume. The idea is now for the camera 5 to observe the image shown by passive and/or active markers 16, 16' which are attached to the power tool 3. The size of the marker image makes it possible to calculate the distance between the camera 5 and the marker plane. The distortion of the marker image makes it possible to determine the position of the marker image or of the power tool 3 in space.

As can be seen from FIG. 5, the camera 5 knows the distances and the position of the light spots and markers 16, 16' on the power tool 3. Its computer uses this information to calculate distance and position.

It should be noted that the markers 16, 16' should be at distances in the order of magnitude of decimeters. Since this means that the framework which supports the markers 16, 16' on the power tool 3 is somewhat bulky, appropriate arrangement must be used to ensure that this does not impede the work.

This method results in the following advantages:
Just one base station, which is formed by the camera 5, is sufficient.
Only a single camera 5 and optical markers 16, 16', which are known per se, are required for the method. Only minimal hardware complexity is required.

As can be seen from FIGS. 1 to 5, the apparatus for carrying out the described method comprises an optical unit which receives and/or transmits optical radiation. For example, this unit may be the light transmitting station 14 and the light receiver 15 shown in FIG. 4. This unit produces the measured values for location of the appliance 3. Furthermore, the apparatus has a computer, which uses the measured values to calculate the position information for the appliance 3. For example, the computer may be located in the camera 5 as shown in FIG. 1, that is to say it may be arranged externally to the appliance 3. Finally, as shown in FIG. 1, a transmitter 17 is arranged in the camera 5 and a receiver 18 is arranged in the appliance 3, by which means the position information is transmitted between the computer and the appliance 3. On the other hand, as shown in FIG. 2, the computer can also be located internally in the appliance 3. Finally, indicating units 7 are located on the appliance 3, and indicate the position information to the user, for manual position control.

The invention is not restricted to the described and illustrated exemplary embodiments. In fact, it also covers all specialist developments within the scope of the invention defined by the patent claims. The invention can therefore be used not only in fixed buildings, but also for processing of mobile workpieces.

List of Reference Symbols
1: Workpiece/plane/working surface/wall
2: Nominal position
3: Appliance/power tool/drilling machine
4: Object
5, 5': Camera
6: (Electromagnetic) signal
7: Display/indicating unit
8: Reticle/marking/light pattern
9: (Fixed) reference/cross/calibration cross
10: Structure
11: Marking (on the appliance)/marker
12: Base/base line
13: Light beam/laser sheet 14: Light transmitting station/base station
15: Light receiver/sensor/reflector ball
16, 16': Marker (on the appliance)
17: Transmitter
18: Receiver
19: Sensor

We claim:

1. A method for processing a workpiece using an appliance that can be moved by hand to at least one predetermined nominal position, comprising carrying out substantially continuous position identification for at least one of the respective actual position of the appliance and of an object that can be moved in correspondence with the appliance, and indicating on the appliance at least one of position information of the respective actual position and information relating to any discrepancy between the nominal position and the actual position, whereby a user of the appliance can use the position information for manual position control of the appliance, wherein the appliance projects a marking onto the workpiece and the position of the marking is recorded by at least one camera.

2. The method as claimed in claim 1, wherein the position information is transmitted wirelessly to the appliance.

3. The method as claimed in claim 1, wherein the appliance has a marking and the position of the marking is recorded by at least two cameras.

4. The method as claimed in claim 3, wherein the two cameras are fixed on a base.

5. The method as claimed in claim 1, wherein the appliance has at least two markers and the image of the markers is recorded by a camera such that the position of the appliance can be determined from the recorded image.

6. The method as claimed in claim 1, wherein the appliance is an electric hand tool.

7. The method as claimed in claim 1, wherein the position identification is performed using optical devices.

8. The method as claimed in claim 1, wherein the position information includes coordinate position.

9. The method as claimed in claim 1, wherein the position of the marking is recorded relative to a fixed reference.

10. An apparatus for carrying out the method as claimed in claim 1, comprising an optical unit which at least one of receives and transmits optical radiation and produces measured values to locate the appliance, a computer which uses the measured values to calculate the position information for the appliance, and an indicating unit on the appliance, which indicates the position information to the user, for manual position control.

11. The apparatus as claimed in claim 10, wherein the computer for calculating the position information is arranged in the appliance.

12. The apparatus as claimed in claim 10, wherein the computer for calculating the position information is arranged externally to the appliance, and at least one of transmitters and receivers preferably transmit the position information between the computer and the appliance.

13. A method for processing a workpiece using an appliance that can be moved by hand to at least one predetermined nominal position, comprising carrying out substantially continuous position identification for at least one of the respective actual position of the appliance and of an object that can be moved in correspondence with the appliance, and indicating on the appliance at least one of position information of the respective actual position and information relating to any discrepancy between the nominal positon and the actual position, whereby a user of the appliance can use the position information for manual position control of the appliance, wherein a light beam, which is moveable on the horizontal plane and on the vertical plane starting from an initial position, is transmitted by a light transmitting station, and the incidence of the light beam on the appliance is registered by means of a light receiver that is located on the appliance, such that the position of the appliance can be determined by the time difference between the transmission of the light beam in the initial position and the reception of the light beam at the light receiver.

14. The method as claimed in claim 13, wherein the light beam is supplied by a laser.

15. The method as claimed in claim 13, further comprising determining the distance between the light transmitting station and the appliance by a distance measuring method, and determining the position of the appliance by the distance determined by the distance measuring method.

16. A method for processing a workpiece using an appliance that can be moved by hand to at least one predetermined nominal position, comprising carrying out substantially continuous position identification for at least one of the respective actual position of the appliance and of an object that can be moved in correspondence with the appliance, and indicating on the appliance at least one of position information of the respective actual position and information relating to any discrepancy between the nominal position and the actual position, whereby a user of the appliance can use the position information for manual position control of the appliance, further comprising a sensor located on the appliance to detect changes in the structure on the workpiece during movement of the appliance, wherein the position information of the appliance is determined on the basis of the relative movement of the appliance, using the detected changes in the structure.

* * * * *